(12) United States Patent
Tachiiri et al.

(10) Patent No.: US 7,441,632 B2
(45) Date of Patent: Oct. 28, 2008

(54) FORCE SENSOR AND MOTOR-DRIVEN PARKING BRAKE APPARATUS USING THE SAME

(75) Inventors: Yoshikazu Tachiiri, Kariya (JP); Takahiro Kiso, Kariya (JP); Nobuyuki Saito, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 292 days.

(21) Appl. No.: 11/169,950

(22) Filed: Jun. 30, 2005

(65) Prior Publication Data

US 2006/0001316 A1    Jan. 5, 2006

(30) Foreign Application Priority Data

Jun. 30, 2004    (JP)    ............................. 2004-193031

(51) Int. Cl.
F16D 66/00    (2006.01)
B60L 7/00    (2006.01)
G01B 7/16    (2006.01)
G01L 1/00    (2006.01)

(52) U.S. Cl. ............. 188/1.11 E; 188/162; 73/862.473; 73/862.626; 73/779

(58) Field of Classification Search ............. 188/1.11 E, 188/158, 159, 160, 161, 162; 324/207.2; 303/3.166, 191, 199, DIG. 3; 73/862.473, 73/862.626, 121, 862.46, 779, 862.331–335, 73/862.193, 862.69
See application file for complete search history.

(56) References Cited

U.S. PATENT DOCUMENTS

| | | | |
|---|---|---|---|
| 6,213,259 B1* | 4/2001 | Hanson et al. | 188/156 |
| 6,232,768 B1* | 5/2001 | Moody et al. | 324/207.12 |
| 6,382,741 B1* | 5/2002 | McCann et al. | 303/191 |
| 6,752,249 B1* | 6/2004 | Jungbecker et al. | 188/162 |
| 6,959,794 B2* | 11/2005 | Ralea et al. | 188/156 |
| 2002/0066626 A1* | 6/2002 | Gill et al. | 188/158 |
| 2003/0034774 A1* | 2/2003 | Pfeil et al. | 324/207.2 |
| 2005/0127902 A1* | 6/2005 | Sogge et al. | 324/207.2 |
| 2005/0189183 A1* | 9/2005 | Gil et al. | 188/2 D |
| 2005/0250382 A1* | 11/2005 | Mourad et al. | 439/578 |

FOREIGN PATENT DOCUMENTS

| | | |
|---|---|---|
| WO | 02/20324 A1 | 3/2002 |
| WO | 02/057122 A1 | 7/2002 |

* cited by examiner

*Primary Examiner*—Robert A. Siconolfi
*Assistant Examiner*—Thomas W Irvin
(74) *Attorney, Agent, or Firm*—Buchanan Ingersoll & Rooney PC (57) ABSTRACT

A force sensor includes a shaft to which a magnet is fixed, and a case which can reciprocate with respect to the shaft and to which a Hall IC element is fixed. The Hall IC element outputs an output voltage which changes in accordance with relative displacement between the Hall IC element and the magnet. A main spring is interposed between the shaft and the case and elastically deforms in accordance with force produced between the shaft and the case in the reciprocating direction. A sub spring is provided in order to impart a preload such that when the amount of elastic deformation of the main spring is substantially zero, no axial clearance is formed between a flange portion of the shaft and one end portion of the main spring, and no axial clearance is formed between the case and the other end of the main spring.

11 Claims, 7 Drawing Sheets

FORCE SENSOR AND MOTOR-DRIVEN PARKING BRAKE APPARATUS USING THE SAME

BACKGROUND OF THE INVENTION

1. Field of the Invention

The present invention relates to a force sensor and a motor-driven parking brake apparatus using the force sensor, and is applicable to, for example, a parking brake apparatus for a vehicle.

2. Description of the Related Art

A conventional force sensor includes a first member to which a magnet is fixed; a second member to which an electrical element is fixed, wherein an output voltage of the electrical element varies with relative displacement in relation to the magnet; and a main spring which is interposed between the first member and the second member, and elastically deforms in accordance with force in the reciprocating direction produced between the first member and the second member. International patent application laid-open Nos. 02/20324 (WO 02/20324 A1) and 02/057122 (WO 02/057122 A1) disclose such a force sensor.

Also, these publications disclose a motor-driven parking brake apparatus using the above-described force sensor. The motor-driven parking brake apparatus can be used in a vehicle, and is configured to bring a parking brake into a braking state through rotation of an electric motor in the regular direction, and to bring the parking brake into a released state through rotation of the electric motor in the reverse direction.

In the force sensor described in the publications, along the direction of relative reciprocating movement between the first member and the second member, the first member separably abuts one end portion of the main spring, and the second member separably abuts the other end portion of the main spring. Therefore, even after the amount of elastic deformation of the main spring becomes zero as a result of release of the above-mentioned force, the return movement of the second member with respect to the first member cannot be stopped, and consequently the magnet and the electrical element can still produce a relative displacement therebetween, whereby the output voltage from the electrical element changes continuously. Accordingly, a point in time at which release of the above-mentioned force is completed; i.e., a point in time at which the amount of elastic deformation of the main spring becomes zero, cannot be detected accurately.

In the case where the main spring does not cause permanent set, the point in time at which release of the above-mentioned force is completed can be detected as follows. The force sensor is previously measured for the relation between the amount of elastic deformation of the main spring and the output voltage from the electrical element, and a value of the output voltage from the electrical element at the time the amount of elastic deformation of the main spring becomes zero is previously obtained as a reference value. Through comparison of the actual output voltage from the electrical element with the reference value, the point in time at which release of the above-mentioned force is completed can be detected. However, it is not uncommon for permanent set of the main spring to be generated because of use, and the above-mentioned reference value varies with the permanent set of the main spring. Therefore, although at the beginning of actual use of the sensor the point in time at which release of the above-mentioned force is completed can be detected accurately, in an intermediate or late stage of use, the point in time at which release of the above-mentioned force is completed cannot be detected accurately.

Moreover, in the motor-driven parking brake apparatus using a force sensor disclosed in the above-mentioned publications, even when proper setting is performed at the beginning of use, because of generation of permanent set of the main spring, the sensor becomes unable to accurately detect a time at which the force acting on the parking braking becomes substantially zero, possibly raising various problems in relation to control of operation of the electric motor.

SUMMARY OF THE INVENTION

The present invention has been accomplished in order to solve the problems in conventional force sensors, and an object of the present invention is to provide a force sensor capable of accurately detecting a time at which release of force is completed (i.e, a time at which acting force becomes substantially zero).

Another object of the present invention is to provide a motor-driven parking brake apparatus which uses the force sensor of the present invention to thereby solve the problems in conventional motor-driven parking brake apparatuses.

In order to achieve the above object, the present invention provides a force sensor which comprises a first member to which a magnet is fixed; a second member to which an electrical element is fixed, the electrical element outputting an output voltage that varies in accordance with relative displacement of the electrical element with respect to the magnet; a main spring interposed between the first member and the second member and elastically deforming in accordance with force produced between the first member and the second member along a direction of reciprocation of the first member with respect to the second member; and a sub spring for imparting a preload such that, in a state in which the amount of elastic deformation of the main spring is substantially zero, no clearance along the direction of reciprocation is formed between the first member and one end portion of the main spring and no clearance along the direction of reciprocation is formed between the second member and the other end portion of the main spring.

In the force sensor of the present invention, when the first member relatively moves with respect to the second member along the direction of reciprocation of the first member with respect to the second member (the direction of elastic deformation of the main spring), the main spring elastically deforms in accordance with force produced between the first member and the second member along the direction of reciprocation, and a relative displacement corresponding to the amount of the deformation is produced between the magnet and the electrical element, so that the output voltage of the electrical element changes in accordance with the force. Accordingly, the force can be detected on the basis of the output voltage of the electrical element.

Incidentally, in the force sensor according to the present invention, when the force is released, after the amount of elastic deformation of the main spring becomes substantially zero, the return movement of the first member with respect to the second member is stopped by means of the preload imparted by the sub spring, so that the relative displacement between the magnet and the electrical element becomes zero, and the output voltage of the electrical element stops changing. Such an operation is performed in a similar manner even after the dimension of the main spring as measured along the direction of elastic deformation varies because of permanent set of the main spring. Accordingly, a point in time at which release of the above-mentioned force is completed (a point in time at which the force becomes substantially zero) can be accurately detected not only at the beginning of use of the force sensor, but also in intermediate and late stages of use thereof, through an operation of detecting a point in time at which the output voltage of the electrical element stops changing.

When the force sensor according to the present invention is implemented, a guide and an urging member are preferably provided so as to maintain a substantially constant clearance between the magnet and the electrical element in a direction generally perpendicular to the direction of relative displacement between the magnet and the electrical element. In this force sensor, the clearance between the magnet and the electrical element as measured in the direction substantially perpendicular to the direction of relative displacement between the magnet and the electrical element is maintained generally constant by means of the guide and the urging member. Therefore, the output voltage of the electrical element stably changes in accordance with the above-mentioned force. Accordingly, the detection accuracy of the force sensor can be improved.

In order to achieve the second object of the present invention, the present invention provides a motor-driven parking brake apparatus which comprises an actuator for bringing a parking brake into a braking state through driving of the electric motor to rotate in a regular direction, and bringing the parking brake into a released state through driving of the electric motor to rotate in a reverse direction; a force sensor according to the present invention used to detect force acting on the parking brake; and an electrical control apparatus for controlling the rotation of the electric motor in accordance with the output voltage of the force sensor.

In the motor-driven parking brake apparatus, at the time of release of the parking brake, a point in time at which the force acting on the parking brake becomes substantially zero can be accurately detected by use of the force sensor, irrespective of permanent set of the main spring in the force sensor. Therefore, excessive release of the parking brake can be prevented through an operation of stopping the rotation of the electric motor in the reverse direction when the force acting on the parking brake becomes substantially zero.

When the motor-driven parking brake apparatus according to the present invention is implemented, the electrical control apparatus preferably includes reference value update means so as to store, as a reference value, the output voltage of the electric element when the sensor detects that the force acting on the parking brake has become substantially zero. Since this motor-driven parking brake apparatus includes reference value update means so as to store, as a reference value, the output voltage of the electric element when the sensor detects that the force acting on the parking brake has become substantially zero, when the main spring in the force sensor has undergone permanent set, the reference value is updated in accordance with the degree of the permanent set of the main spring. Accordingly, through an operation of stopping the rotation of the electric motor in the regular direction when the output voltage of the electric element reaches a set value (with the reference value being regarded as the zero point), irrespective of permanent set of the main spring in the force sensor, the intended force can be imparted to the parking brake to thereby bring the parking brake into the desired braking state.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
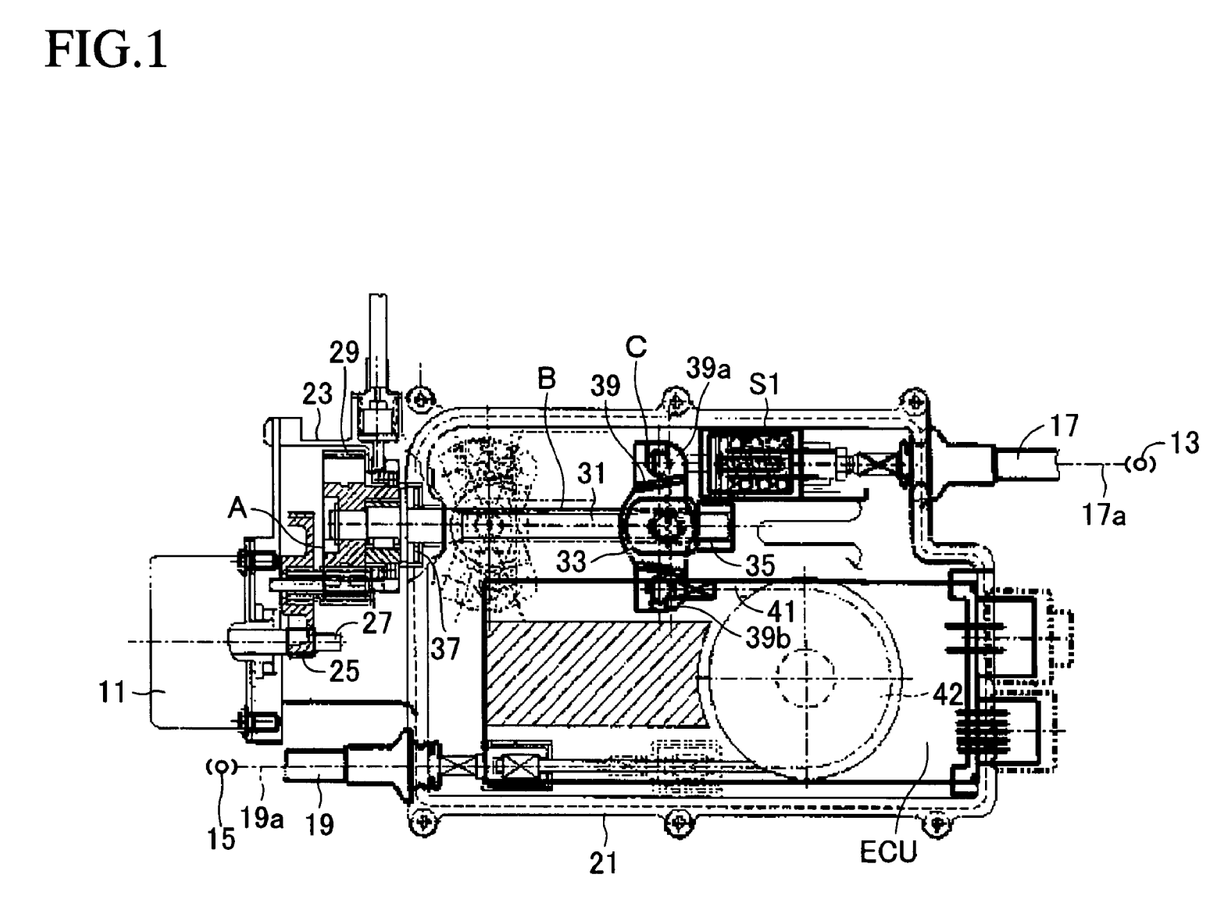
FIG. 1 is a partial cutaway plan view showing an embodiment of a motor-driven parking brake apparatus according to the present invention.

An embodiment of the present invention will be described with reference to the drawings. FIG. 1 shows an actuator of a motor-driven parking brake apparatus for a vehicle to which the present invention is applied. This actuator comprises a speed reduction mechanism A for transmitting rotational drive force, which is an output of an electric motor 11, while reducing the rotational speed; a conversion mechanism B for converting into a linear drive force the rotational drive force of the electric motor 11 which is transmitted through the speed reduction mechanism A; an equalizer mechanism C driven by the linear drive force output from the conversion mechanism B and distributing the linear drive force to two output portions; two cables 17 and 19 which are connected to the corresponding output portions of the equalizer mechanism C and transmit the linear drive force to corresponding parking brakes 13 and 15; and an electric control unit ECU for controlling the rotation of the electric motor 11.

Figure 2:
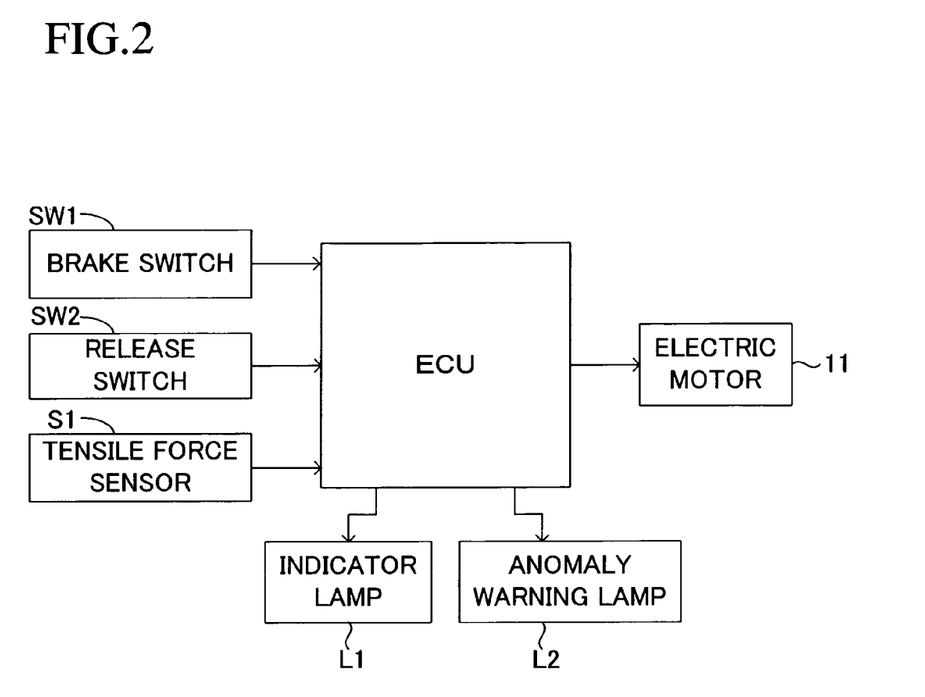
FIG. 2 is a block diagram showing the relation between an electric motor, a tensile force sensor, and an electric control apparatus, which are shown in FIG. 1, and a brake switch, a release switch, an indicator lamp, and an anomaly warning lamp, which are not shown in FIG. 1.

As shown in FIG. 2, operation of the electric motor 11 is controlled by means of the electric control unit ECU. When a driver operates a brake switch SW1, the electric motor 11 is driven to rotate in the regular direction, and when the driver operates a release switch SW2, the electric motor 11 is driven to rotate in the reverse direction. As shown in FIG. 1, the speed reduction mechanism A is composed of a multi-stage train of helical reduction gears, which are assembled in a casing 23 attached to a housing 21. An input gear 25 is fixed to an output shaft 27 of the electric motor 11, and an output gear 29 is fixed to one end of a screw shaft 31 (an end portion projecting into the interior of the casing 23).

The conversion mechanism B includes the above-mentioned screw shaft 31, and a nut 33 in screw engagement with the screw shaft 31. When the screw shaft 31 is driven to rotate in the regular direction, the nut 33 is moved along the axial direction of the screw shaft 31 from a release position indicated by a solid line in FIG. 1 to a braking position indicated by an imaginary line in FIG. 1. When the screw shaft 31 is driven to rotate in the reverse direction, the nut 33 is moved along the axial direction of the screw shaft 31 toward the release position indicated by the solid line in FIG. 1. Notably, the screw shaft 31 is supported on the housing 21 via a pair of bearings 35 and 37 such that the screw shaft 31 is rotatable, but is not axially movable.

The equalizer mechanism C equally distributes the linear drive force acting on the nut 33 to the two output portions, and is composed of a lever 39, which is swingably attached to the nut 33. The lever 39 is mounted, at its central portion, to the nut 33 so as to be swingable to a predetermined extent. An inner wire 17a of the first cable 17 is rotatably connected via a tensile force sensor S1 to an arm portion 39a of the lever 39, which serves a first output section. An inner wire 19a of the second cable 19 is rotatably connected via a connection cable 41 to an arm portion 39b of the lever 39, which serves a second output section. The connection cable 41 is wound around a stationary pulley 42, which is rotatably mounted to the housing 21. The inner wire 19a of the second cable 19 extends outward from the housing 21 in a direction opposite the inner wire 17a of the first cable 17.

Figure 3:
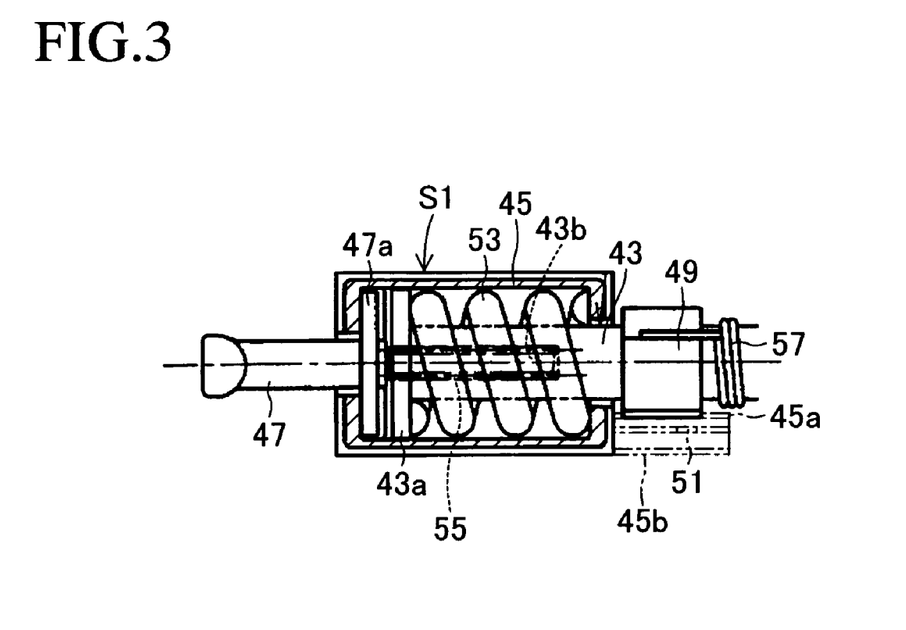
FIG. 3 is an enlarged view of the tensile force sensor shown in FIG. 1.
Figure 4:
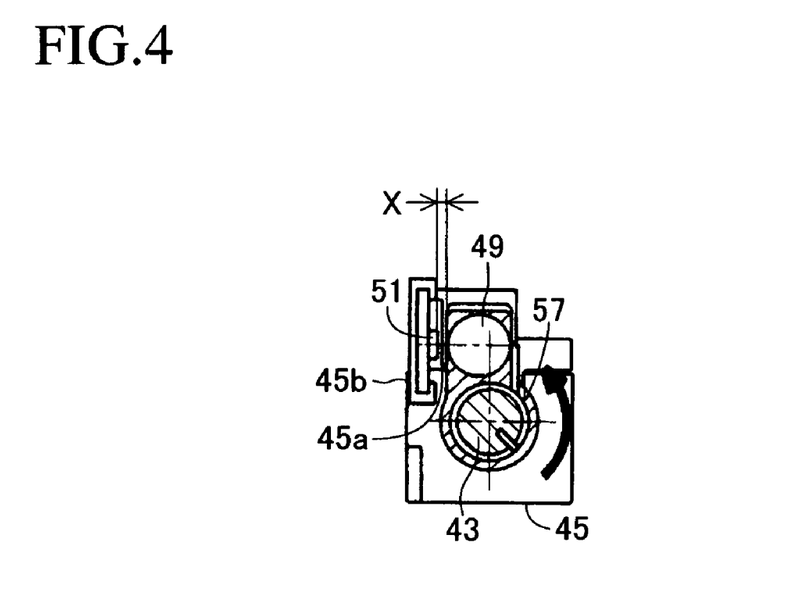
FIG. 4 is a vertical sectional side view showing the relation among a shaft, case, magnet, Hall IC element, torsion spring, etc., of the tensile force sensor shown in FIG. 3.

As shown in FIG. 1, the tensile force sensor S1 is interposed in a connection portion between the inner wire 17a of the first cable 17 and the arm portion 39a, which serves the first output section of the equalizer mechanism C, and detects tensile force F acting on the inner wire 17a of the first cable 17. As shown in FIGS. 3 and 4, the tensile force sensor S1 includes a shaft 43, serving as a first member; a case 45 and a rod 47, serving as a second member; a magnet 49; a Hall IC element 51; a main spring 53; and a sub spring 55.

The shaft 43 can reciprocate relative to the case 45 along the axial direction of the shaft. At an outer end portion, which projects outward from the case 45, the shaft 43 is connected to an end portion of the inner wire 17a of the first cable 17. The case 45 accommodates an inner end portion of the shaft 43, an inner end portion of the rod 47, the main spring 53, and the sub spring 55. The rod 47 is rotatably connected, at its outer end portion, to the first arm portion 39a of the lever 39, and is integrally connected and fixed to one end of the case 45 via a flange portion 47a integrally provided at an inner end portion thereof.

The magnet 49 is over-molded with resin, and is mounted via a torsion spring or urging member 57 on the outer circumference of an outer end portion of the shaft 43, which projects outward from the case 45, such that the magnet 49 is rotatable and is movable together with the shaft 43 along the axial direction thereof. The magnet 49 moves along the shaft axial direction in a state as shown in FIG. 4 in which the magnet 49 is in contact with a guide projection 45a formed on the case 45; i.e., a state in which a clearance X between the magnet 49 and Hall IC element 51 as measured in a direction substantially perpendicular to the shaft axial direction is maintained generally constant. Therefore, the output voltage V of the Hall IC element 51 varies stably in accordance with the tensile force F acting on the inner wire 17a of the cable 17.

The Hall IC element 51 is fixed to a support arm 45b formed on the case 45, and outputs to the electric control unit ECU an output voltage V corresponding to the amount of relative displacement between the Hall IC element 51 and the magnet 49 along the shaft axial direction; i.e., the amount of compressive elastic deformation of the main spring 53 corresponding to the tensile force F of the inner wire 17a. The main spring 53 is a helical compression spring which is mounted on the outer circumference of an inner end portion of the shaft 43 and is interposed between the case 45 and a flange portion 43a formed at an end of the shaft 43 so as to elastically connect the shaft 43 and the case 45.

The sub spring 55 is a compressive coil spring which is accommodated within an attachment hole 43b formed at the center of an inner end portion of the shaft 43. The sub spring 55 has a spring constant sufficiently smaller than that of the main spring 53, and is interposed between the shaft 43 and the rod 47. This sub spring 55 imparts a small preload such that when the amount of compressive elastic deformation of the main spring 53 is substantially zero, no axial clearance is formed between the flange portion 43a of the shaft 43 and the first end portion of the main spring 53, and no axial clearance is formed between the case 45 and the second end portion of the main spring 53.

Figure 5:
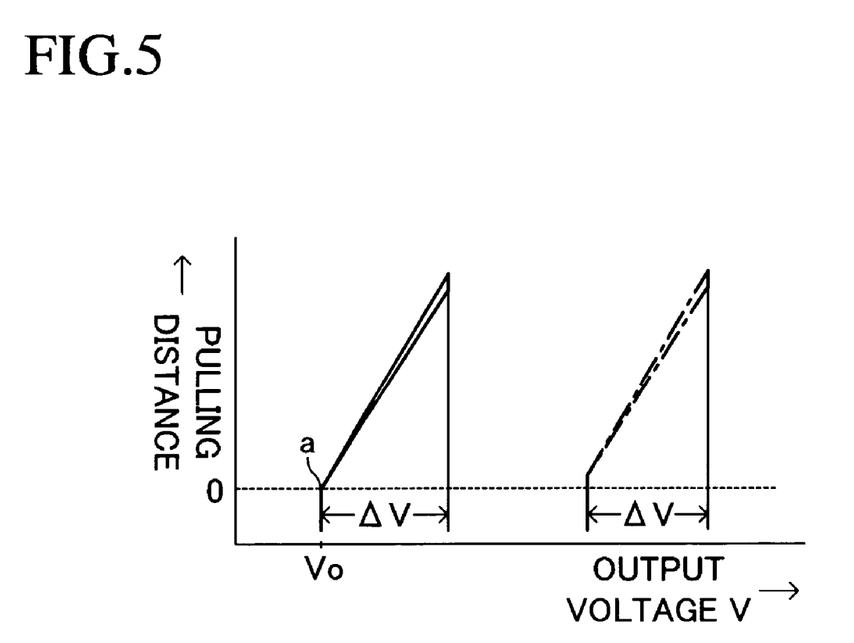
FIG. 5 is a graph showing the relation between pulling distance of the tensile force sensor shown in FIG. 1 and output voltage of the Hall IC element.

Therefore, when the tensile force F acting on the inner wire 17a of the cable 17 is released, after the amount of compressive elastic deformation of the main spring 53 becomes substantially zero, the return movement of the case 45 with respect to the shaft 43 is stopped by means of the preload imparted by the sub spring 55, so that the relative displacement between the magnet 49 and the Hall IC element 51 becomes zero, and the output voltage V of the Hall IC element 51 stops changing (see the vicinity of a point where the pulling distance is zero in FIG. 5).

Such an operation is performed in a similar manner even after the dimension of the main spring 53 as measured along the direction of compressive elastic deformation varies because of generation of permanent set of the main spring 53. Accordingly, a point in time at which release of the above-mentioned tensile force F is completed can be accurately detected not only at the beginning of use of the tensile force sensor S1, but also in intermediate and late stages of use thereof, through an operation of detecting a point in time (point a in FIG. 5) at which the output voltage V of the Hall IC element 51 stops changing because of completion of release of the tensile force F, from, for example, a sharp change in the decreasing gradient δ of the output voltage V. Notably, when permanent set of the main spring 53 is generated, as indicated by an alternate long and short dashed line in FIG. 5, the output voltage V of the Hall IC element 51 increases over the entire range of the pulling distance.

As shown in FIG. 2, the electric control apparatus ECU is electrically connected to the brake switch SW1 and the release switch SW2, and is also electrically connected to the tensile force sensor S1, the electric motor 11, an indicator lamp L1, an anomaly warning lamp L2, etc. The electric control apparatus ECU includes a microcomputer composed of a CPU, ROM, RAM, an interface, a timer, etc. In response to operation of the brake switch SW1 and the release switch SW2, the CPU of the electric control apparatus ECU selectively executes control programs corresponding to the flow-charts of FIGS. 6 and 7, respectively, to thereby control rotation of the electric motor 11, operation (ON and OFF) of the indicator lamp L1, and operation (ON and OFF) of the anomaly warning lamp L2.

In the embodiment having the above-described configuration, when the actuator operates normally, in response to operation of the brake switch SW1, the electric motor 11 is driven to rotate in the regular direction, whereby the screw shaft 31 of the conversion mechanism B is rotated in the regular direction. As a result, the equalizer mechanism C moves from the position indicated by the solid line in FIG. 1 to the position indicated by the imaginary line in FIG. 1 before a timer value t clocked by the timer of the microcomputer (time elapsed after the brake switch SW1 is operated) reaches a set time T1. Therefore, the inner wires 17a and 19a of the cables 17 and 19 are pulled, so that the parking brakes 13 and 15 are brought into a braking state.

At this time, in the tensile force sensor S1, the case 45 is pulled and moved forward with respect to the shaft 43 along the direction of elastic deformation of the main spring 53, and thus, the main spring 53 is elastically deformed and compressed in accordance with the pulling force acting on the shaft 43. As a result, a relative displacement corresponding to the amount of compressive elastic deformation is produced between the magnet 49 and the Hall IC element 51, so that the output voltage V of the Hall IC element 51 increases in accordance with the pulling force acting on the shaft 43; i.e., the tensile force F acting on the inner wire 17a of the cable 17.

Figure 6:
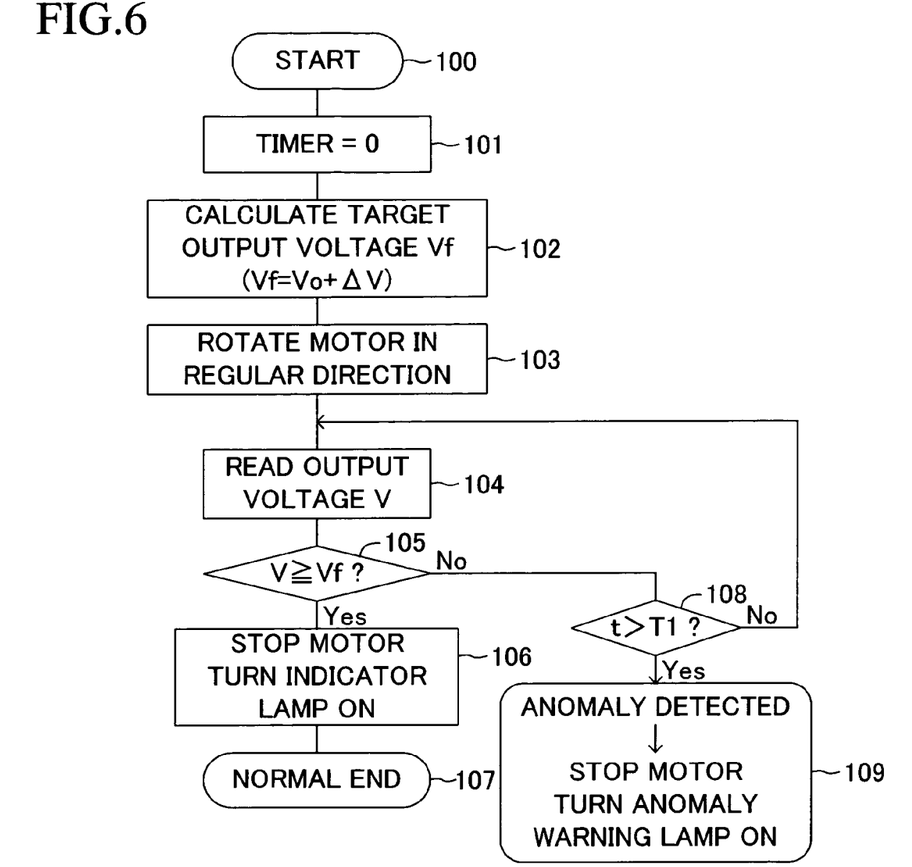
FIG. 6 is a flowchart corresponding to a control program which the CPU of a microcomputer contained in the electric control apparatus shown in FIG. 1 executes in response to operation of the brake switch.

In the above-described braking operation, during a period in which the brake switch SW1 is operated and the equalizer mechanism C moves from the position indicated by the solid line in FIG. 1 to the position indicated by the imaginary line in FIG. 1, after execution of Steps 100, 101, 102, 103, 104, and 105 of the flowchart shown in FIG. 6, Steps 108, 104, and 105 are repeatedly executed. In Step 100, the execution of the program is started in response to a signal indicating that the brake switch SW1 is operated, and in Step 101, the timer value t of the timer is reset to zero.

Further, in Step 102, a target output voltage Vf is calculated from a reference value Vo and a set value $\ddot{A}V$, and is stored. In Step 103, a drive signal for driving the electric motor 11 to rotate in the regular direction is output. In Step 104, the output voltage V of the Hall IC element 51 is read from the tensile force sensor S1, and is stored. In Step 105, a determination is made as to whether the output voltage V of the Hall IC element 51 read and stored in Step 104 and the above-mentioned target output voltage Vf satisfy the inequality $V \geq Vf$. In Step 108, a determination is made as to whether the timer value t of the timer and the set time T1 satisfy the inequality $t > T1$.

The reference value Vo used in the calculation processing of Step 102 is previously set to an initial value (the value at point a) under the assumption of a state in which permanent set of the main spring 53 has not yet occurred as indicated by the solid line in FIG. 5. However, upon performance of a release operation to be described later, the reference value Vo is updated so as to increase with the degree of permanent set of the main spring 53 during performance of the release operation. The set value $\ddot{A}V$ used in the calculation processing of Step 102 is a fixed value previously set in consideration of the relation between the amount of movement (i.e., the pulling distance) of the equalizer mechanism C (see FIG. 5) and the tensile force F acting on the inner wire 17a of the cable 17 such that the respective parking brakes 13 and 15 produce desired braking forces. Further, the set time T1 used in the processing of Step 108 is a fixed value previously set in consideration of the performances of the electric motor 11, the speed reduction mechanism A, the conversion mechanism B, etc. in terms of rotation in the regular direction.

In the above-described braking operation, when the equalizer mechanism C has moved from the position indicated by the solid line in FIG. 1 to the position indicated by the imaginary line in FIG. 1 and the output voltage V of the Hall IC element 51 has reached the target output voltage Vf, a "Yes" determination is made in Step 105 of the flowchart shown in FIG. 6, and Steps 106 and 107 are then performed. Therefore, in this case, through execution of Step 106, the indicator lamp L1 is turned on, and the rotation of the electric motor 11 in the regular direction is stopped, whereby the parking brakes 13 and 15 are maintained in the braking state. After that, the execution of the program is ended through execution of Step 107.

Notably, in the case where the output voltage V of the Hall IC element 51 does not reach the target output voltage Vf before the time elapsed after operation of the brake switch SW1; i.e., the timer value t of the timer, reaches the set time T1 (the case of anomalous operation of the actuator), when the timer value t of the timer has reached the set time T1, a "Yes" determination is made in Step 108 of the flowchart shown in FIG. 6, and Step 109 is then executed. Therefore, in this case, through execution of Step 109, the anomaly warning lamp L2 is turned on, and driving of the electric motor 11 to rotate in the regular direction is stopped.

When the actuator operates normally, in response to operation of the release switch SW2, the electric motor 11 is driven to rotate in the reverse direction, whereby the screw shaft 31 of the conversion mechanism B is rotated in the reverse direction. As a result, the equalizer mechanism C moves from the position indicated by the imaginary line in FIG. 1 to the position indicated by the solid line in FIG. 1 before the timer value t clocked by the timer of the microcomputer (time elapsed after the release switch SW2 is operated) reaches a set time T2. Therefore, the inner wires 17a and 19a of the cables 17 and 19 are loosened, so that the parking brakes 13 and 15 are brought into a released state.

At this time, in the tensile force sensor S1, the case 45 returns with respect to the shaft 43 along the direction of elastic deformation of the main spring 53, and thus, the main spring 53 is elastically restored in accordance with the pulling force acting on the shaft 43. As a result, a relative displacement corresponding to the amount of elastic restoration is produced between the magnet 49 and the Hall IC element 51, so that the output voltage V of the Hall IC element 51 decreases in accordance with a decrease in the pulling force acting on the shaft 43; i.e., the tensile force F acting on the inner wire 17a of the cable 17.

Figure 7:
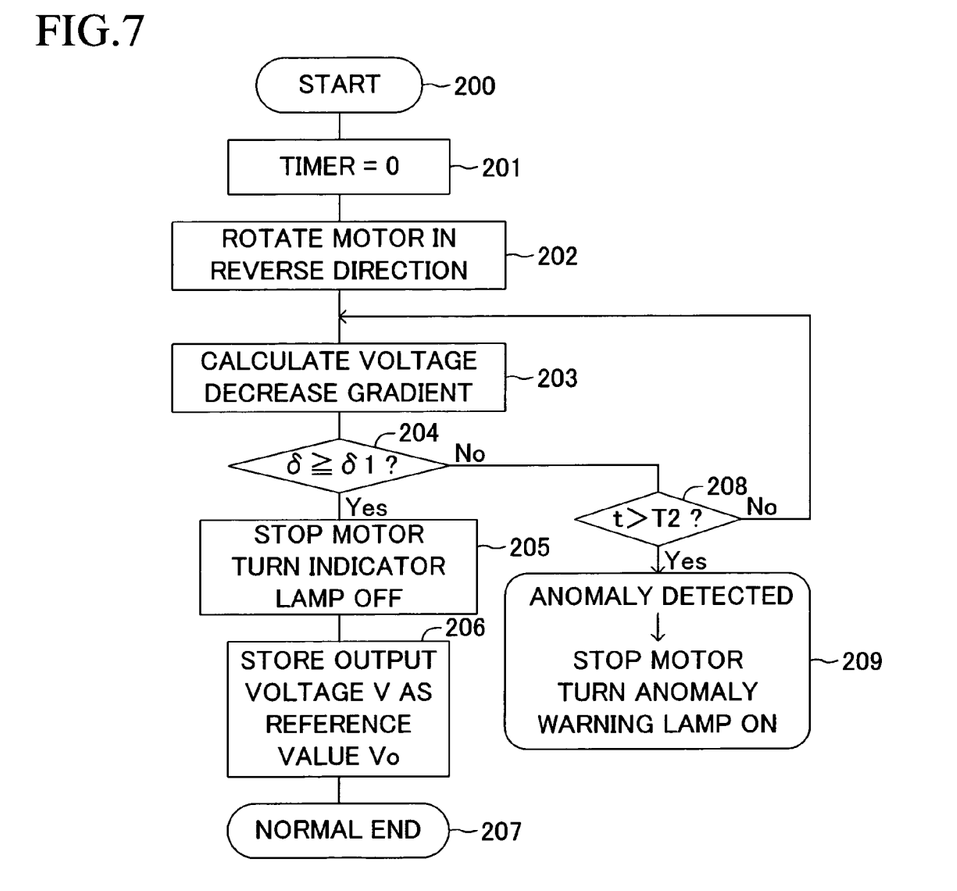
FIG. 7 is a flowchart corresponding to a control program which the CPU executes in response to operation of the release switch.

In the above-described releasing operation, during a period in which the release switch SW2 is operated and the equalizer mechanism C moves from the position indicated by the imaginary line in FIG. 1 to the position indicated by the solid line in FIG. 1, after execution of Steps 200, 201, 202, 203, and 204 of the flowchart shown in FIG. 7, Steps 208, 203, and 204 are repeatedly executed. In Step 200, the execution of the program is started in response to a signal indicating that the release switch SW2 is operated, and in Step 201, the timer value t of the timer is reset to zero.

Further, in Step 202, a drive signal for driving the electric motor 11 to rotate in the reverse direction is output. In Step 203, a voltage decreasing gradient $\delta$ of the output voltage V of the Hall IC element 51 is calculated on the basis of the output voltage V of the Hall IC element 51 of the tensile force sensor S1, and is stored. In Step 204, a determination is made as to whether the voltage decreasing gradient $\delta$ calculated and stored in Step 203 and a set value $\delta 1$ satisfy the inequality $\delta \geq \delta 1$. In Step 208, a determination is made as to whether the timer value t of the timer and the set time T2 satisfy the inequality $t > T2$.

The set value $\delta 1$ used in the processing of Step 204 is a fixed value previously set for detection of the point a shown in FIG. 5. Further, the set time T2 used in the processing of Step 208 is a fixed value previously set in consideration of the performances of the electric motor 11, the speed reduction mechanism A, the conversion mechanism B, etc. in terms of rotation in the reverse direction.

In the above-described releasing operation, when the equalizer mechanism C has moved from the position indicated by the imaginary line in FIG. 1 to the position indicated by the solid line in FIG. 1 and the output voltage V of the Hall IC element 51 has returned to the reference value Vo and becomes generally constant with the result that the voltage decreasing gradient δ changes sharply and becomes equal to or greater than the set value δ1, a "Yes" determination is made in Step 204 of the flowchart shown in FIG. 7, and Steps 205, 206, and 207 are then performed. Therefore, in this case, through execution of Step 205, the indicator lamp L1 is turned off, and the rotation of the electric motor 11 in the reverse direction is stopped, whereby the parking brakes 13 and 15 are maintained in the released state. Further, through execution of Step 206, the voltage V output from the Hall IC element 51 at that time is stored as the reference value Vo, which is used in the calculation of the above-described target output voltage Vf. After that, the execution of the program is ended through execution of Step 207.

Notably, in the case where the voltage decreasing gradient δ does not change sharply to exceed the set value δ1 before the time elapsed after operation of the release switch SW2; i.e., the timer value t of the timer, reaches the set time T2 (the case of anomalous operation of the actuator), when the timer value t of the timer has reached the set time T2, a "Yes" determination is made in Step 208 of the flowchart shown in FIG. 7, and Step 209 is then executed. Therefore, in this case, through execution of Step 209, the anomaly warning lamp L2 is turned on, and the driving of the electric motor 11 to rotate in the reverse direction is stopped.

In the present embodiment, at the time of release of the parking brakes 13 and 15, a point in time at which the tensile force F acting on the inner wire 17a of the cable 17 becomes substantially zero can be accurately detected by use of the tensile force sensor S1 irrespective of permanent set of the main spring 53 in the tensile force sensor S1. Further, since the rotation of the electric motor 11 in the reverse direction is stopped when the tensile force F acting on the inner wire 17a of the cable 17 becomes substantially zero, excessive release of the cables 17a and 19a can be prevented.

In the present embodiment, Step 206 of FIG. 7 is provided in order to store, as the reference value Vo, the output voltage V of the Hall IC element 51 of the tensile force sensor S1 when the tensile force F acting on the inner wire 17a of the cable 17 is detected to have become substantially zero, when the main spring 53 in the tensile force sensor S1 has undergone permanent set, the reference value Vo is updated in accordance with the degree of the permanent set of the main spring 53. Accordingly, when the output voltage V of the Hall IC element 51 becomes ÄV with the updated reference voltage Vo regarded as the zero point; i.e. when the output voltage V of the Hall IC element 51 becomes the target output voltage Vf (=Vo+ÄV), as shown in Steps 105 and 106 of FIG. 6, the rotation of the electric motor 11 in the regular direction can be stopped. Therefore, irrespective of permanent set of the main spring 53 in the tensile force sensor S1, the intended tensile force F can be imparted to the inner wires 17a and 19a of the cables to thereby bring the parking brakes 13 and 15 into the intended braking states.

In the above-described embodiment, the reference value Vo is always updated through execution of Step 206. However, the embodiment may be modified such that the reference value Vo is updated only when the output voltage V changes from the previously stored reference value Vo by a predetermined value or greater.

In the above-described embodiment, the present invention is applied to the tensile sensor S1 which is interposed in the connection portion between the inner wire 17a of the first cable 17 and the arm portion 39a, which serves the first output section of the equalizer mechanism C, and which detects tensile force F acting on the inner wire 17a of the first cable 17. However, as in an embodiment shown in FIG. 8, the present invention can be applied to a tensile sensor S1 which is interposed between the housing 21 and an extended shaft portion 31a of the screw shaft 31 (in this embodiment, the screw shaft 31 is supported to be axially movable relative to the housing 21) and detects axial force acting on the screw shaft 31.

Figure 8:
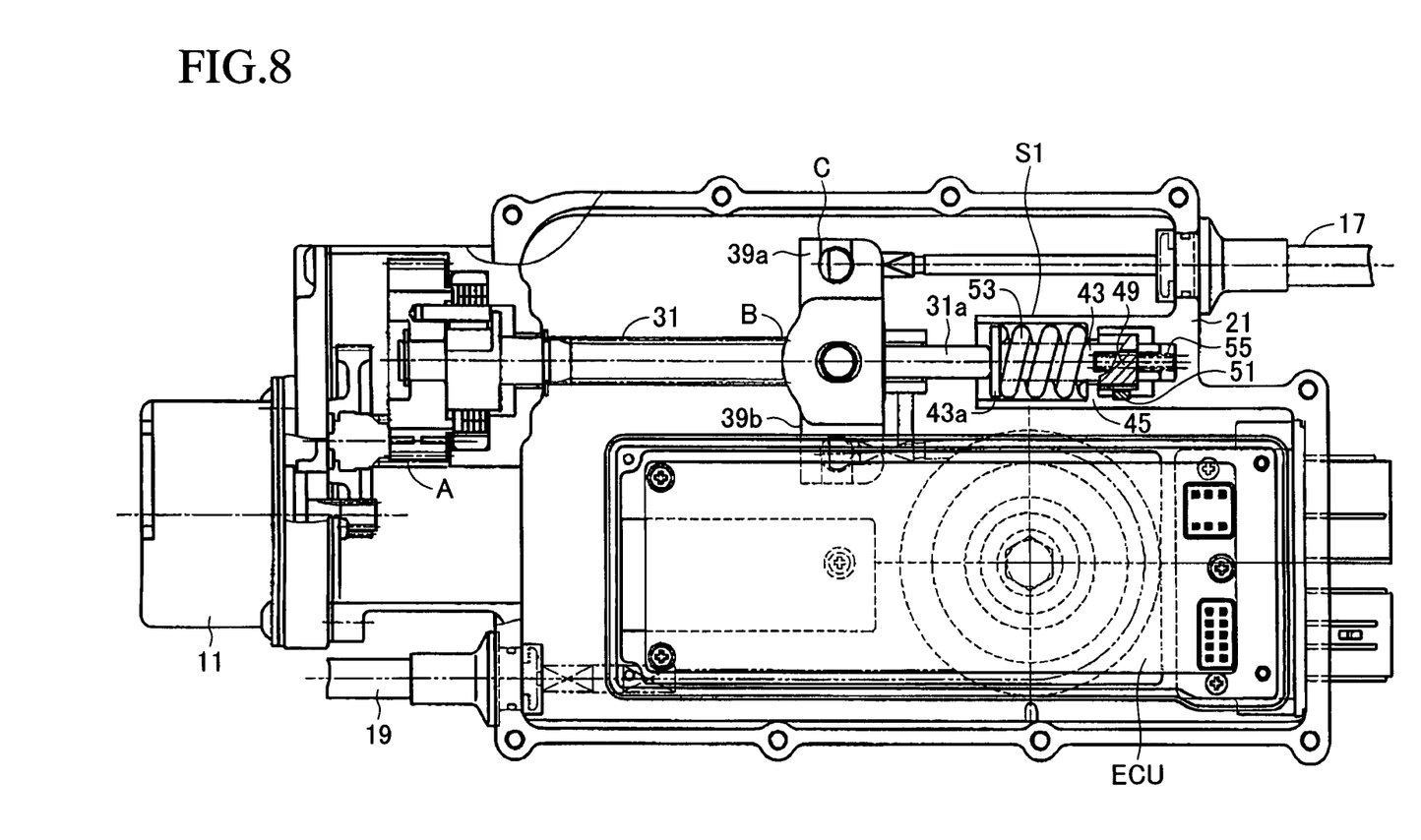
FIG. 8 is a partial cutaway plan view showing another embodiment of the motor-driven parking brake apparatus according to the present invention.

The force sensor S1 of the embodiment shown in FIG. 8 includes a shaft 43 serving as a first member; a case 45 serving as a second member; a magnet 49; a Hall IC element 51; a main spring 53; and a sub spring 55. Notably, the structures of the magnet 49, the Hall IC element 51, the main spring 53, the sub spring 55, etc. are substantially the same as those of the above-described embodiment, except that the sub spring 55 is a helical tension spring. Therefore, their descriptions are omitted.

What is claimed is:

1. A force sensor comprising:
   a first member to which a magnet is fixed;
   a second member to which an electrical element is fixed, the electrical element outputting an output voltage that varies in accordance with relative displacement of the electrical element with respect to the magnet;
   a main coil spring interposed between the first member and the second member and elastically deforming in accordance with force produced between the first member and the second member along a direction of reciprocation of the first member with respect to the second member; and
   a sub coil spring, which is disposed within the main coil spring, for imparting a preload such that, in a state in which the amount of elastic deformation of the main coil spring is substantially zero, no clearance along the direction of reciprocation is formed between the first member and one end portion of the main coil spring and no clearance along the direction of reciprocation is formed between the second member and the other end portion of the main coil spring;
   the main coil spring and sub coil spring are arranged such that as the amount of elastic deformation of the main coil spring increases, the amount of elastic deformation of the sub coil spring decreases.

2. A force sensor according to claim 1, further comprising a guide and an urging member so as to maintain a substantially constant clearance between the magnet and the electrical element in a direction generally perpendicular to the direction of relative displacement between the magnet and the electrical element.

3. A motor-driven parking brake apparatus comprising:
   an actuator for bringing a parking brake into a braking state through driving of the electric motor to rotate in a regular direction, and bringing the parking brake into a released state through driving of the electric motor to rotate in a reverse direction;
   a force sensor according to claim 1 used to detect force acting on the parking brake; and
   an electrical control apparatus for controlling the rotation of the electric motor in accordance with the output voltage of the force sensor.

4. A motor-driven parking brake apparatus comprising:
   an actuator for bringing a parking brake into a braking state through driving of the electric motor to rotate in a regular direction, and bringing the parking brake into a released state through driving of the electric motor to rotate in a reverse direction;
   a force sensor according to claim 2 used to detect force acting on the parking brake; and an electrical control apparatus for controlling the rotation of the electric motor in accordance with the output voltage of the force sensor.

5. A motor-driven parking brake apparatus according to claim 3, wherein the electrical control apparatus includes reference value update means for storing, as a reference value, the output voltage of the electric element when the sensor detects that the force acting on the parking brake has become substantially zero.

6. A motor-driven parking brake apparatus according to claim 4, wherein the electrical control apparatus includes reference value update means for storing, as a reference value, the output voltage of the electric element when the sensor detects that the force acting on the parking brake has become substantially zero.

7. A force sensor according to claim 1, wherein the magnet is fixed to the first member by a torsion spring such that the magnet is rotatable and movable together with the first member.

8. A force sensor according to claim 1, wherein at least a portion of the first member is positioned within the main coil spring.

9. A force sensor according to claim 1, wherein the first member comprises a shaft having a flange portion and one end of the main coil spring abuts the flange portion.

10. A force sensor according to claim 1, wherein the first member comprises a shaft, and the magnet is mounted on an outer circumferential portion of the shaft.

11. A force sensor comprising:
a first member to which a magnet is fixed by a torsion spring such that the magnet is rotatable and movable together with the first member;
a second member to which an electrical element is fixed, the electrical element outputting an output voltage that varies in accordance with relative displacement of the electrical element with respect to the magnet;
a main spring interposed between the first member and the second member and elastically deforming in accordance with force produced between the first member and the second member along a direction of reciprocation of the first member with respect to the second member; and
a sub spring for imparting a preload such that, in a state in which the amount of elastic deformation of the main spring is substantially zero, no clearance along the direction of reciprocation is formed between the first member and one end portion of the main spring and no clearance along the direction of reciprocation is formed between the second member and the other end portion of the main spring;
the main spring and sub spring are arranged such that as the amount of elastic deformation of the main spring increases, the amount of elastic deformation of the sub spring decreases.

* * * * *